United States Patent Office 3,464,787
Patented Sept. 2, 1969

3,464,787
PURIFICATION OF HYDROGEN CHLORIDE
Samuel Corbett Carson, Runcorn, England, assignor to Imperial Chemical Industries Limited, London, England, a corporation of Great Britain
No Drawing. Filed Oct. 26, 1966, Ser. No. 589,492
Claims priority, application Great Britain, Nov. 4, 1965, 46,795/65
Int. Cl. C01b 7/08
U.S. Cl. 23—154                                10 Claims

ABSTRACT OF THE DISCLOSURE

Purification of hydrogen chloride gas containing fluorohydrocarbons and fluorochlorohydrocarbons as impurities by contacting the impure gas with a catalyst such as activated alumina, aluminum fluoride, silica-alumina, and chromium oxide at an elevated temperature.

---

This invention relates to a process for the purification of hydrogen chloride gas.

Hydrogen chloride is a by-product in the preparation of fluorinated aliphatic hydrocarbons by the interaction of chloroalkanes with hydrogen fluoride in the vapour phase in the presence of a fluorination catalyst. A large number of catalysts are known to be suitable as fluorination catalysts in this reaction, including activated alumina, aluminum fluoride and catalysts comprising one or more metallic oxides or halides, for example halides of chromium, nickel, cobalt or iron and oxides of chromium or iron. By-product hydrogen chloride arising from this fluorination reaction may be utilised in a wide variety of chemical processes but the presence of hydrogen fluoride, fluorohydrocarbons or fluorochlorohydrocarbons as impurities in the hydrogen chloride is undesirable in many processes. Methods are available for the removal of hydrogen fluoride impurity from hydrogen chloride but it is very desirable to provide a convenient, economic method for removal of fluorohydrocarbons and/or fluorochlorohydrocarbons.

We have now found that hydrogen chloride gas containing as impurities one or more aliphatic fluorohydrocarbons or fluorochlorohydrocarbons may be purified by contacting the said gas with a fluorination catalyst at an elevated temperature. It appears that the fluoro- and fluorochloro- compounds are decomposed, in the presence of a large excess of hydrogen chloride gas, to form hydrogen fluoride and chlorohydrocarbons. The hydrogen fluoride may, if desired, be removed from the hydrogen chloride by known means; in many processes requiring hydrogen chloride the chlorohydrocarbons are less objectionable impurities than fluoro- compounds, in particular when the purified hydrogen chloride is used in the manufacture of chloroalkanes.

Thus according to the present invention there is provided a process for the purification of hydrogen chloride gas containing one or more aliphatic fluorohydrocarbons or fluorochlorohydrocarbons as impurities which comprises contacting the said gas with a fluorination catalyst at an elevated temperature.

The process is applicable to the removal of a wide range of aliphatic fluorohydrocarbons and fluorochlorohydrocarbons but is especially applicable to the purification of hydrogen chloride gas containing as impurities one or more fluorochloroalkanes with one or two fluorine atoms in the molecule, for example difluorodichloromethane ($CF_2Cl_2$) and fluoro-trichloromethane ($CFCl_3$).

A wide range of catalysts may be used, for example those mentioned above as suitable for carrying out the preparation of fluorinated aliphatic hydrocarbons. Preferred catalysts are those comprising alumina or aluminum fluoride. It is especially preferred to use activated alumina but in use this may be at least partially converted into aluminum fluoride.

In general, it is preferred to maintain the catalyst at a temperature of at least 200° C., for example in the range 300° C. to 500° C.; the range 300° C. to 400° C. is especially preferred. The hydrogen chloride gas may be passed through a static bed or a fluidised bed of the catalyst.

The process may conveniently be carried out at substantially atmospheric pressure but higher or lower pressures may be used.

The purified hydrogen chloride may be recovered as a gas or as a solution, for example as hydrochloric acid by absorption in water.

The invention is illustrated, but not limited, by the following examples.

Example 1

Hydrogen chloride gas, containing 850 parts per million (by volume) of $CF_2Cl_2$, was passed at the rate of 75 litres per hour through a 1-inch diameter bed of 12 grams of activated alumina ("Actal A") maintained at 350° C.

After 24 hours of continuous flow the exit gas contained less than 10 parts per million (by volume) of $CF_2Cl_2$ and 27 parts per million (by weight) of "ionisable fluorine" (expressed as fluoride ion).

After 112 hours the exit gas contained 50 parts per million (by volume) of $CF_2Cl_2$ and 220 parts per million (by weight) of "ionisable fluorine."

After 145 hours the exit gas contained 110 parts per million (by volume) of $CF_2Cl_2$ and 280 parts per million (by weight) of "ionisable fluorine."

Example 2

Hydrogen chloride gas, containing 970 parts per million (by volume) of $CF_2Cl_2$, was passed at the rate of 75 litres per hour through a 1-inch diameter bed of 13 grams of aluminum fluoride maintained at 350° C.

After 148 hours of continuous flow the exit gas contained 50 parts per million (by volume) of $CF_2Cl_2$ and 80 parts per million (by volume) of $CFCl_3$.

Example 3

Hydrogen chloride gas, containing 780 parts per million (by volume) of $CF_2Cl_2$, was passed at the rate of 75 litres per hour through a 1-inch diameter bed containing 17 grams of silica-alumina maintained at 350° C. The silica-alumina, which contained 60% by weight of $SiO_2$ and 40% by weight of $Al_2O_3$, was in the form of 3 mm. tablets; the surface area was 400 m.²/grams and the mean pore radius was 22 A.

After 46 hours of continuous flow the exit gas contained less than 20 parts per million (by volume) of $CF_2Cl_2$.

Example 4

Hydrogen chloride gas, containing 920 parts per million (by volume) of $CF_2Cl_2$, was passed at the rate of 75 litres per hour through a 1-inch diameter bed containing 18 grams of alumina impregnated with cobalt oxide (2.2% by weight), molybdenum trioxide (7.6% by weight) and magnesium oxide (4.1% by weight); the catalyst bed was maintained at 350° C.

After 20 hours of continuous flow the exit gas contained 195 parts per million (by volume) of $CF_2Cl_2$.

Example 5

Hydrogen chloride gas, containing 850 parts per million (by volume) of $CF_2Cl_2$, was passed at the rate of 75 litres per hour through a 1-inch diameter bed containing 26 grams of black chromium oxide (mixed with 5% by weight of graphite); the catalyst bed was maintained at 350° C.

After 48 hours of continuous flow the exit gas contained 420 parts per million (by volume) of $CF_2Cl_2$.

What I claim is:

1. Process for the removal of fluorohydrocarbon and fluorochlorohydrocarbon impurities from hydrogen chloride gas containing at least one impurity selected from the group consisting of aliphatic fluorohydrocarbons and fluorochlorohydrocarbons, the process consisting essentially of contacting the gas with a bed of a catalyst which consists essentially of at least one member of the group consisting of activated alumina, silica-alumina, aluminum fluoride and chromium oxide, at a temperature of at least 200° C., until the content of impurity is substantially reduced.

2. A process as claimed in claim 1 wherein the starting material is hydrogen chloride gas containing at least one impurity that is a member selected from the group consisting of fluoroalkanes containing one fluorine atom and fluoroalkanes containing two fluorine atoms in the molecule.

3. A process as claimed in claim 2 wherein the hydrogen chloride contains an impurity that is a member of the group consisting of difluorodichloromethane and fluorotrichloromethane.

4. A process as claimed in claim 1, wherein the catalyst consists essentially of activated alumina.

5. A process as claimed in claim 1, wherein the catalyst consists essentially of aluminum fluoride.

6. A process as in claim 1, wherein hydrogen chloride containing $CF_2Cl_2$ as an impurity is contacted with a bed of activated alumina maintained at a temperature of 350° C.

7. A process as in claim 1, wherein hydrogen chloride containing $CF_2Cl_2$ as an impurity is contacted with a bed of aluminum fluoride maintained at a temperature of 350° C.

8. A process as claimed in claim 4, in which the process is carried out in the presence of the oxides of cobalt, molybdenum and magnesium.

9. A process as claimed in claim 1 wherein the temperature is in the range 300° C. to 500° C.

10. A process as claimed in claim 9 wherein the temperature is in the range 300° C. to 400° C.

References Cited

UNITED STATES PATENTS

| 3,278,266 | 10/1966 | Welch | 23—154 |
| 2,450,414 | 10/1948 | Benning | 23—154 XR |
| 2,920,941 | 1/1960 | Sanlaville et al | 23—154 |
| 3,074,779 | 1/1963 | Quin | 23—154 |
| 3,140,916 | 7/1964 | Lowdermilk | 23—154 |

FOREIGN PATENTS

| 470,657 | 1/1951 | Canada. |

EDWARD STERN, Primary Examiner

U.S. Cl. X.R.

23—153; 260—653